United States Patent [19]
Portas et al.

[11] Patent Number: 5,486,388
[45] Date of Patent: *Jan. 23, 1996

[54] ENCLOSURE ASSEMBLY FOR ELONGATE CYLINDRICAL OBJECTS SUCH AS ELECTRIC CABLE SPLICES

[75] Inventors: Francesco Portas, Quattordio; Ubaldo Vallauri, Monza, both of Italy

[73] Assignee: Pirelli Cavi S.p.A., Milan, Italy

[ * ] Notice: The term of this patent shall not extend beyond the expiration date of Pat. No. 5,087,492.

[21] Appl. No.: 370,558

[22] Filed: Jan. 9, 1995

Related U.S. Application Data

[63] Continuation of Ser. No. 985,183, Dec. 2, 1992, abandoned.

[30] Foreign Application Priority Data

Dec. 16, 1991 [IT] Italy .................. MI91A3360

[51] Int. Cl.$^6$ .................................. F16L 11/00
[52] U.S. Cl. .................. 428/34.9; 428/36.9; 428/37; 428/906; 174/DIG. 8; 174/73.1; 138/129
[58] Field of Search ............... 174/DIG. 8, 73.1; 428/34.9, 35.8, 36.9, 906, 36.92, 35.1, 37; 138/129, 144

[56] References Cited

U.S. PATENT DOCUMENTS

| | | | |
|---|---|---|---|
| 3,488,431 | 1/1970 | Nixon | 174/DIG. 8 |
| 3,620,896 | 11/1971 | Glasgow | 174/DIG. 8 |
| 3,691,505 | 9/1972 | Graves | 174/DIG. 8 |
| 3,847,183 | 11/1974 | Meyer | 174/DIG. 8 |
| 3,946,480 | 3/1976 | Dienes | 29/235 |
| 4,016,356 | 4/1977 | McLoughlin | 174/DIG. 8 |
| 4,389,440 | 6/1993 | Keith | 428/34.9 |
| 4,503,105 | 3/1985 | Tomioka | 428/34.9 |
| 4,871,599 | 10/1989 | Knorr | 428/34.9 |
| 5,087,492 | 2/1992 | Vallauri et al. | 428/34.9 |

FOREIGN PATENT DOCUMENTS

| | | |
|---|---|---|
| 0291203 | 11/1988 | European Pat. Off. . |
| 1292608 | 11/1972 | United Kingdom . |
| 2221356 | 1/1990 | United Kingdom . |

OTHER PUBLICATIONS

*Refer to references filed in Ser. No. #07/972,154.

Primary Examiner—Ellis P. Robinson
Assistant Examiner—Rena L. Dye
Attorney, Agent, or Firm—Brooks Haidt Haffner & DeLahunty

[57] ABSTRACT

The enclosure assembly particularly, but not exclusively, conceived for spliced electric cables, comprises a sleeve of an elastomer material, a support whereover the sleeve is fitted in a state of elastic expansion, said sleeve being adapted to shrink about the elongate cylindrical objects upon removal of the support. The support comprises a tubular body formed of a strip of a strong flexible material wound into a helix having mutually bonded adjacent turns, the turns being separable by applying a pull force along a substantially longitudinal direction to an end portion of the strip unravelled from the adjacent turns and taken through the interior of the tubular body along a substantially axial direction and out through the opposite end of the tubular body. The tubular body comprises at least two regions wherein the helix has different pitches, a fine pitch region and a coarse pitch region; a fine pitch region is provided at the locations of specified portions of the elongate cylindrical objects for which the enclosure assembly is intended.

21 Claims, 6 Drawing Sheets

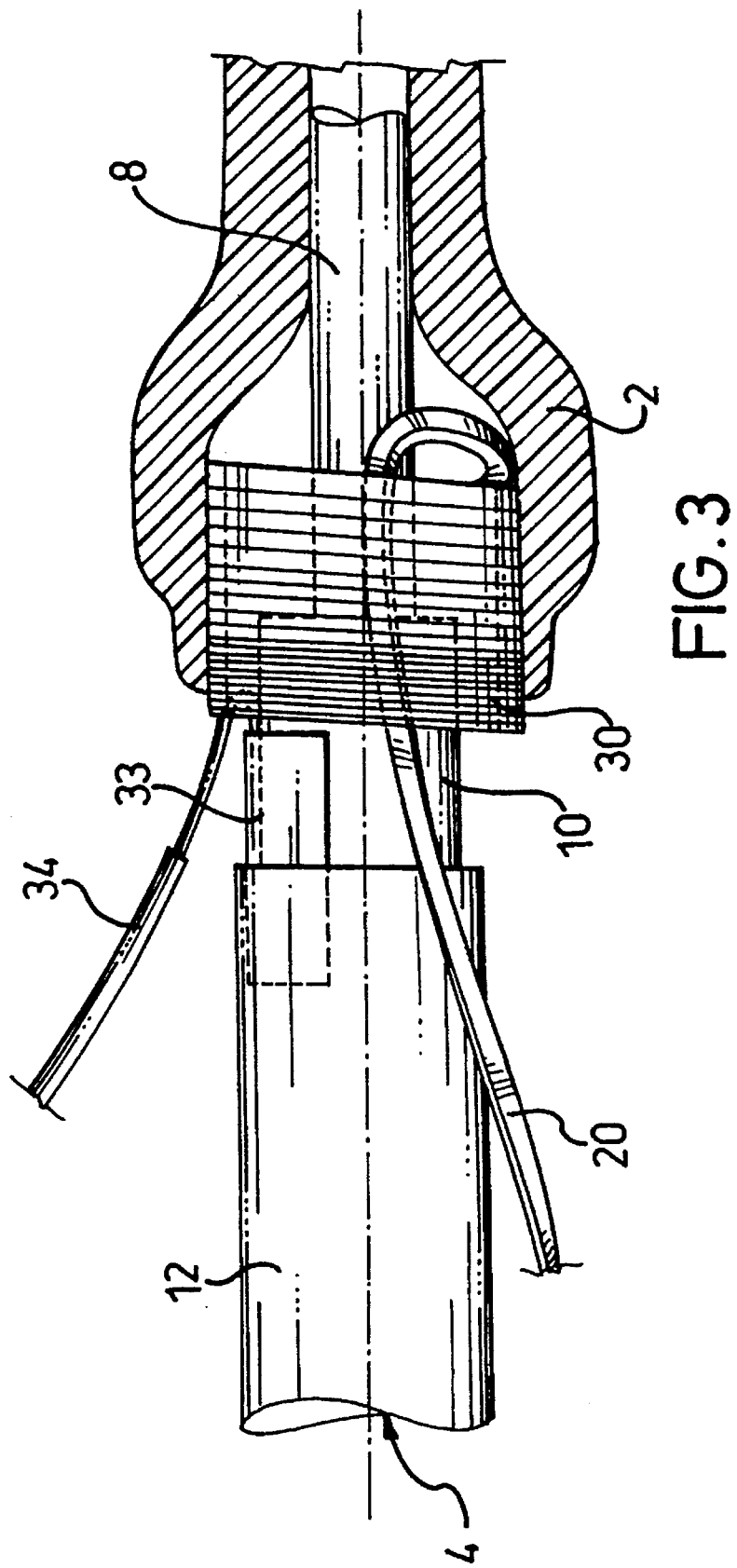

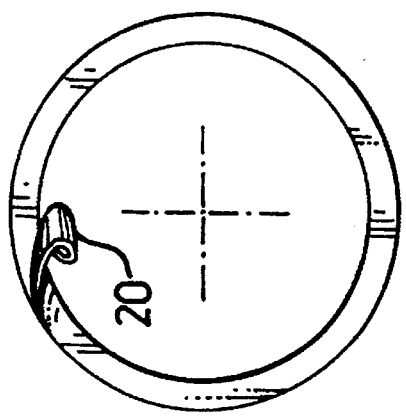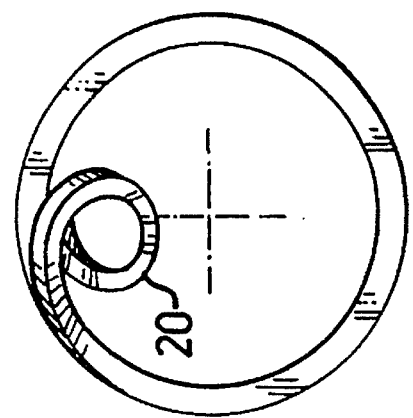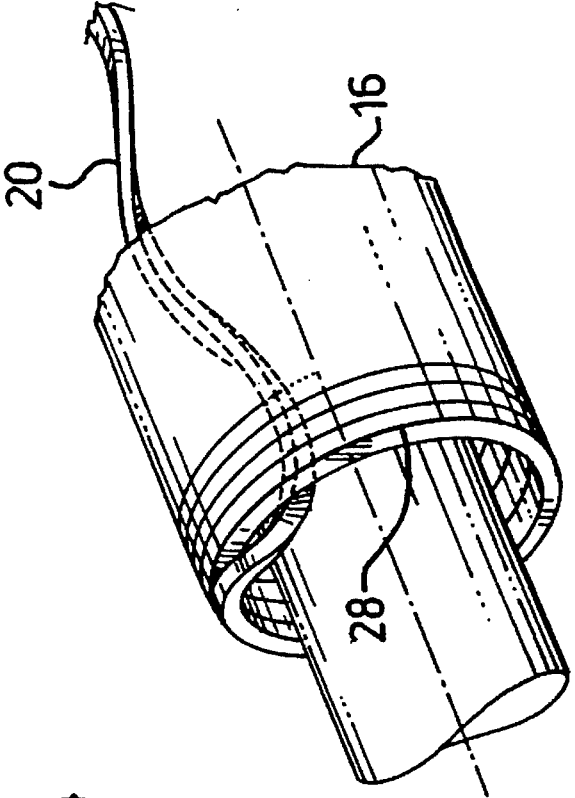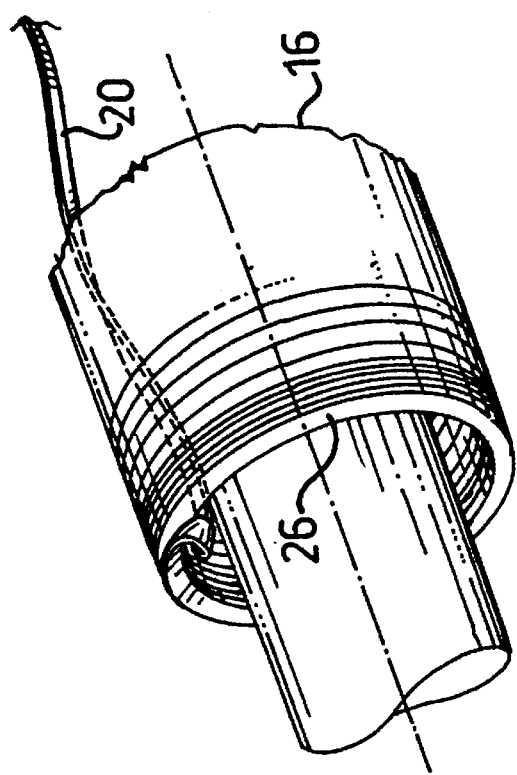

ENCLOSURE ASSEMBLY FOR ELONGATE CYLINDRICAL OBJECTS SUCH AS ELECTRIC CABLE SPLICES

This application is a continuation of application Ser. No. 07/985,183 filed Dec. 2, 1991, now abandoned.

BACKGROUND OF THE INVENTION

1. Field of the Invention

This invention relates to an enclosure assembly for use on elongate cylindrical objects.

More specifically, the invention is directed to sheathing sleeves intended for application over cable splices, or cable ends, in medium- to high-voltage power lines where the high electric potentials involved, being on the order of tens or hundreds kV in magnitude, require that air inclusions be totally absent from between the sleeve inner surface and the outer surface of a cable to be sheathed.

It is understood, however, that the enclosure assembly of this invention may be also employed for applications other than the above-outlined one, for instance over cylindrical objects of various description—such as pipes, rods, bars, and the like—e.g. to provide local protection against corrosion or else.

2. Description of the Related Art

As is known, in splicing electric cables together, it is common practice to remove locally protective and insulating members from around the conductor of either cable, at the ends of the cables to be spliced together, for connection to the conductor of the other cable.

After optionally filling with appropriate materials (jointing compounds, self-amalgamating tapes, or the like) the gaps left from the removal of insulative and/or protective members, the spliced bare ends of the two cables are covered with a sheathing sleeve of an elastomer material which provides the necessary protection and insulation for proper performance of the splice.

The elastomer sleeve is preliminarly fitted, in a condition of elastic expansion, over a tubular cylinder body made of a rigid plastics material to be engaged around either cable prior to splicing.

Subsequently, after the conductors have been spliced to each other, the tubular body is removed from the elastomer sleeve, thereby allowing the sleeve to shrink elastically about the cables at the splice.

A prior art device, as disclosed in Patent GB 1,292,608, provides a support consisting of a tubular cylinder body whereover an elastic covering is fitted. The tubular body is formed with a helical groove around its outer surface. In this way, a continuous strip is substantially created on the tubular cylinder body in the form of a plurality of turns laid consecutively and being set close against one another along a weakening line of reduced thickness which is defined at the bottom of the helical groove.

By exerting a pull force on a free end portion of the strip which extends from one of the turns at the tubular body ends and longitudinally through the body, the turns are progressively separated along said weakening line. Thus, the tubular cylinder body can be removed from the elastic covering by a simple manual operation requiring no special puller.

U.S. Pat. No. 4,503,105 provides a helical groove cut in the thickness of the tubular body. The individual turns are interconnected by longitudinal bridge formations on the tubular body interior whose thickness is only partly affected by the helical groove depth.

European Patent EP 0 291 203 discloses instead a tubular body wherein a plurality of through-going cutouts, set closely apart in a helical pattern, are formed using a suitable tool operated on the outer surface of the cylindrical body.

A further known support, shown in U.S. Pat. No. 4,389,440, has the tubular cylinder body formed by a band-like element which is wound helically into a plurality of side-by-side turns bonded to one another. Here again, by exerting a pull force on a free end portion of the band-like element laid longitudinally through the tubular body, the tubular body is caused to collapse as the turns come progressively apart.

According to the invention, it has been observed that in some instances, such as when sleeves carried on tubular supports are fitted over electric cable splices—particularly in medium voltage applications—the space requirements for the free end portion inside the tubular support may have to be minimized.

In fact, a single size sleeve and respective tubular support to accommodate a range of cable outside diameters is a particularly desirable feature in such applications; for this purpose, to avoid the need for extra radial expansion of the elastic sleeve, the gap between the outer surface of the largest anticipated diameter cable and the inner surface of the tubular support should be kept small. The minimum size of said gap is dictated by the space requirements of the free end portion inside the tubular body.

In fact, in order to fit the sleeve over such cylindrical objects as the elements of a splice between two electric cables, one of the cables must be introduced into the tubular support carrying the sleeve by sliding it over the outer sheath.

At that stage, between the cable and the outer surface of the tubular support there must be left at least a corresponding space to the overall radial dimension of the band-like extension within the tubular support. It has been found, moreover, that a highly flexible free end portion is a specially important feature.

In fact, some regions of the cable splice are covered or filled with self-amalgamating tapes, compounds, greases, or the like, i.e. with soft materials liable to be harmed or deformed by rubbing contact with harder elements, specifically the free end portion.

In addition, the surface of the cable insulator may also become scored or damaged from rubbing contact with a harder element, such as the free end portion, to leave a region prone on triggering surface electric discharges in operation of the joint.

The free end portion, when bent over and led through the tubular support interior, forms a loop with origin in its area of separation from the intact portion of the support, which represents some bulk within the tubular support.

The size of the loop, and hence its space requirements inside the tubular support, will be the larger, the lower is the flexibility of the free end portion.

SUMMARY OF THE INVENTION

In accordance with this invention, it has been found that by providing some selected regions of the tubular support with a shorter pitch than that of the remaining regions, the band-like extension can be given minimum dimensions and a high flexibility in the most critical areas, without affecting by so doing the resistance of the tubular body to the radial pressure from the elastic sleeve, or extending beyond acceptable limits the sleeve installation time.

Thus, in a first aspect, this invention relates to an enclosure assembly for elongate cylindrical objects, comprising a substantially tubular support, a sleeve of an elastomer material fitted over the support in a condition of elastic expansion and adapted to shrink about the elongate cylindrical objects upon removal of the support, wherein the support comprises a tubular body consisting of a strip of a strong flexible material wound into a helix having mutually bonded adjacent turns, the turns being separable by application of a pull force along a substantially longitudinal direction to an end portion of the strip unravelled from the adjacent turns through the interior of the tubular body along a substantially axial direction and out through the opposite end of the tubular body, characterized in that the tubular body has a least two regions where the helix has different pitches, one region being a fine pitch region and the other a coarse pitch one, a fine pitch region being provided at the locations of specified portions of the elongate cylindrical objects for which the enclosure assembly is intended.

By appropriate selection of the fine pitch region(s) and the coarse pitch region(s), it becomes possible to remove the support in a gradual fashion and only provide a specially slim cross-section for the strip where this is indeed necessary; where such requirements are secondary, the choice of a coarse pitch allows the overall support remove time to be reduced and the resistance to the radial pressure from the elastic sleeve to be increased.

Preferably, a fine pitch region is provided at one end of the tubular body, which region has an axial length at least equal to the end portion of the strip unravelled through the tubular body interior.

In fact, it has been found advantageous to provide a fine pitch region at the location wherefrom the strip withdrawal and support removal are to begin, because this enables an initial portion of the strip to be made specially thin and flexible, and therefore, of minimal radial bulk for fitting the assembly over the elongate objects to be sheathed. This is quite important in the instance of electric cable splices, since at the initial stage of its installation, the enclosure assembly is slipped over one of the two cables to be spliced together and must, therefore, be able to accommodate the whole cable section including those protective and covering parts which have been removed from the splice area, thereby reducing its radial bulk.

Advantageously, two fine pitch regions are provided at either ends of the tubular body.

In this way, it can be arranged for the removal of the last portion of the tubular body to also occur gradually, and the risk avoided of the combined effects of the elastic forces tending to contract the sleeve and the pull force applied to the strip causing undesired displacement of the residual portion of the tubular body: this could otherwise result in the elongate objects to be protected becoming damaged or full removal of the tubular body being impeded (or made altogether impossible in the least favorable of cases).

Advantageously, the tubular body, prior to unravelling the end portion of the strip through the tubular body interior, has the two fine pitch regions extended substantially symmetrically along the axial direction. This makes the tubular body production easier both as regards the cutting step to produce the helical strip and the step of parting the end portion taken through the tubular body interior; in fact, there is no need to tell the two ends from each other.

The support for the enclosure assembly may comprise a single tubular body having at least the same axial dimension as the sleeve.

Furthermore, the assembly may be intended for sheathing objects (such as electric cable splices) having a particularly vulnerable central portion which could be harmed by an excessively rough removal of the tubular body or by rubbing contact with the strip, the latter tending to form, upon separation from the tubular body, an inward loop whose radial dimension grows as the strip becomes less flexible. Advantageously in this case, a fine pitch region is provided at the central portion of the single tubular body.

Alternatively, the support may comprise two substantially cylindrical, tubular bodies having ends abutted coaxially with each other in mutual continuation relationship, the abutted ends being disposed at a significantly inward location with respect to the longitudinal dimension of the sleeve, at least one turn of the strip of each tubular body being unravelled at the location of the abutted ends and taken through the tubular body interior and out through the opposite end of each tubular body. This embodiment affords better control of the enclosure assembly positioning, since the assembly begins to shrink tight in the central region, and any axial deformations accompanying the radial contraction would be split between either sides of said central region.

In the particular instance of the enclosure assembly for elongate cylindrical objects being intended for use over electric cable splices, with each cable having at least one conductor and an insulative covering, wherein a section of the insulator removed from the cable ends and the respective conductors are spliced together by some means of electric connection, preferably over the length of the spliced bare conductors, the support would comprise one or more fine pitch regions.

This is indeed an area where the risk of damage from the strip rubbing on very soft parts is particularly felt.

Preferably, the fine pitch is within the range of 0.5 to 1.5 mm.

The helical strip turns can be obtained by a number of processes: a preferred one of such processes consists of cutting a helical groove in the wall of the tubular body to such a depth as to leave a residual thickness which can be ruptured by application of a pull to the strip, the fine pitch not to be smaller than the least residual thickness of the tubular body. Better still, the fine pitch should not be less than twice the residual thickness. This ensures proper rupturing of the turns.

Preferably, when referred to the wall thickness of the tubular body, the fine pitch is between 20% and 50% of said thickness.

Preferably, the coarse pitch does not exceed in size the least clearance between the elongate cylindrical object and the inner surface of the tubular support. Better still, the coarse pitch is within the range of 2 to 6 mm.

Preferably, when referred to the wall thickness (i.e., the radial thickness) of the tubular body, the coarse pitch is between 75% and 200% of said thickness.

A second aspect of the invention provides a tubular body for holding a sleeve of an elastomeric material incorporated to an enclosure assembly for elongate cylindrical objects in a condition of elastic expansion, being of a type which comprises a strip of a strong flexible material wound into a helix having mutually bonded adjacent turns, the turns being separable by application of a pull force along a substantially longitudinal direction to an end portion of the strip unravelled from the adjacent turns through the interior of the tubular body along a substantially axial direction and out through the opposite end of the tubular body, characterized in that it has at least two regions where the helix has different pitches, one region being a fine pitch region and the other a coarse pitch one.

One or more such tubular bodies enable a support for an enclosure assembly to be provided whereby removal can take place gradually in some (fine pitch) regions of minimum thickness of the strip and faster in some other (coarse pitch) regions opposing maximum resistance to the radial pressure from the elastic sleeve.

Preferably, the tubular body has a fine pitch region at one end of the tubular body, which region has an axial length at least equal to that of the end portion of the strip unravelled inside the tubular body. Thus, a think flexible strip is formed at the location of that portion of the tubular body which is to be removed first.

Advantageously, in order for the removal to also occur gradually at the location of that portion of the tubular body which is to be removed last, the tubular body is formed with two fine pitch regions at either ends of the tubular body. Preferably, such two fine pitch regions have substantially symmetrical axial lengths prior to unwinding the end portion of the strip through the tubular body interior. This is specially advantageous in that it allows symmetrical bodies to be formed, which bodies require no provisions for telling the two ends from each other during the manufacture of enclosure assemblies.

Preferably, the tubular body also includes a fine pitch region at the location of the central portion of the tubular body. This embodiment is specially useful where enclosure assemblies have their support formed of a single tubular body, to provide a thin strip, gradually removable region at the location of the central portion of the sleeve.

BRIEF DESCRIPTION OF THE DRAWINGS

Further features and advantages of an enclosure assembly according to the invention will become apparent from the following detailed description of some preferred embodiments thereof, to be read in conjunction with the accompanying drawings, in which:

FIG. 3 is a sectional view showing schematically the assembly of FIG. 1 as fitted over a different electric cable splice, during removal of the last support portion;

FIG. 4 is a perspective detail view of the assembly of FIG. 1, during removal of a fine pitch region of the support;

FIG. 5 is a schematic front view of the detail shown in FIG. 4;

FIG. 6 is a perspective detail view of the assembly of FIG. 1, during removal of a coarse pitch region of the support;

FIG. 7 is a schematic front view of the detail shown in FIG. 6;

FIGS. 8 and 9 illustrate a situation of uneven separation due to improper sizing of the pitch, and FIGS. 10 and 11 illustrate a situation of even separation;

DESCRIPTION OF THE PREFERRED EMBODIMENT

Figure 1:
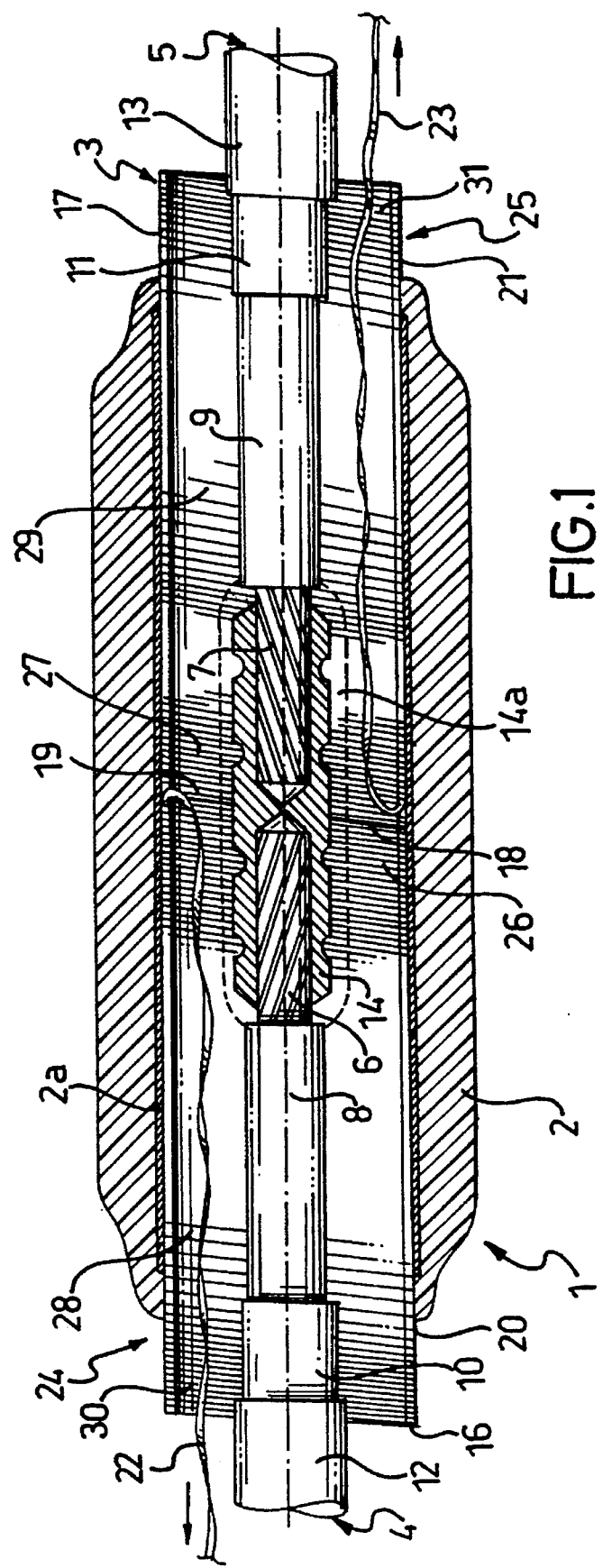
FIG. 1 is a sectional view showing schematically an enclosure assembly according to one embodiment of the invention, including a support formed of two tubular bodies abutting each other, as fitted over two spliced electric cables prior to removing the support.

In the drawing views, generally shown at 1 is an enclosure assembly which comprises a radically stretched elastic sleeve 2 the bore of said sleeve having a predetermined radius in its unstretched state and being fitted, in a condition of elastic expansion, over a tubular supporting body disposed within the bore of said sleeve and having a longitudinal axis, the tubular supporting body being shown as support 3, the tubular supporting body having an external surface around said axis of a radius greater than said predetermined radius to cause radial stretching of said sleeve 2 and having an internal surface around said axis of a radius smaller than the radius of said external surface, said enclosure assembly being useful to protect a splice between two electric cables 4 and 5, e.g. for medium voltage (up to 20–30 kV) applications.

The cables 4 and 5 include respective conductors 6 and 7, said conductors being the bared conductors of an electric cable, which are conductively connected when the cable is repaired, said conductors being covered by respective insulators 8 and 9; capacitive shields 10 and 11 of a semiconductor material and outer protection sheaths 12 and 13 are customarily provided externally of the insulators.

At the location of the splice between the electric cables 4 and 5, all of the aforesaid elements of the cables 4 and 5 are stripped in succession (as shown particularly in FIGS. 1 and 2); the dimensions of the bare portions of each element are set by applicable standards, such as French Standard EDF HN 68-S-08 of June, 1987. The bare portions of the conductors 6 and 7 are joined by means of a metal clamp, to be clamped about the conductors 6 and 7, or by soldering or else.

Figure 12:
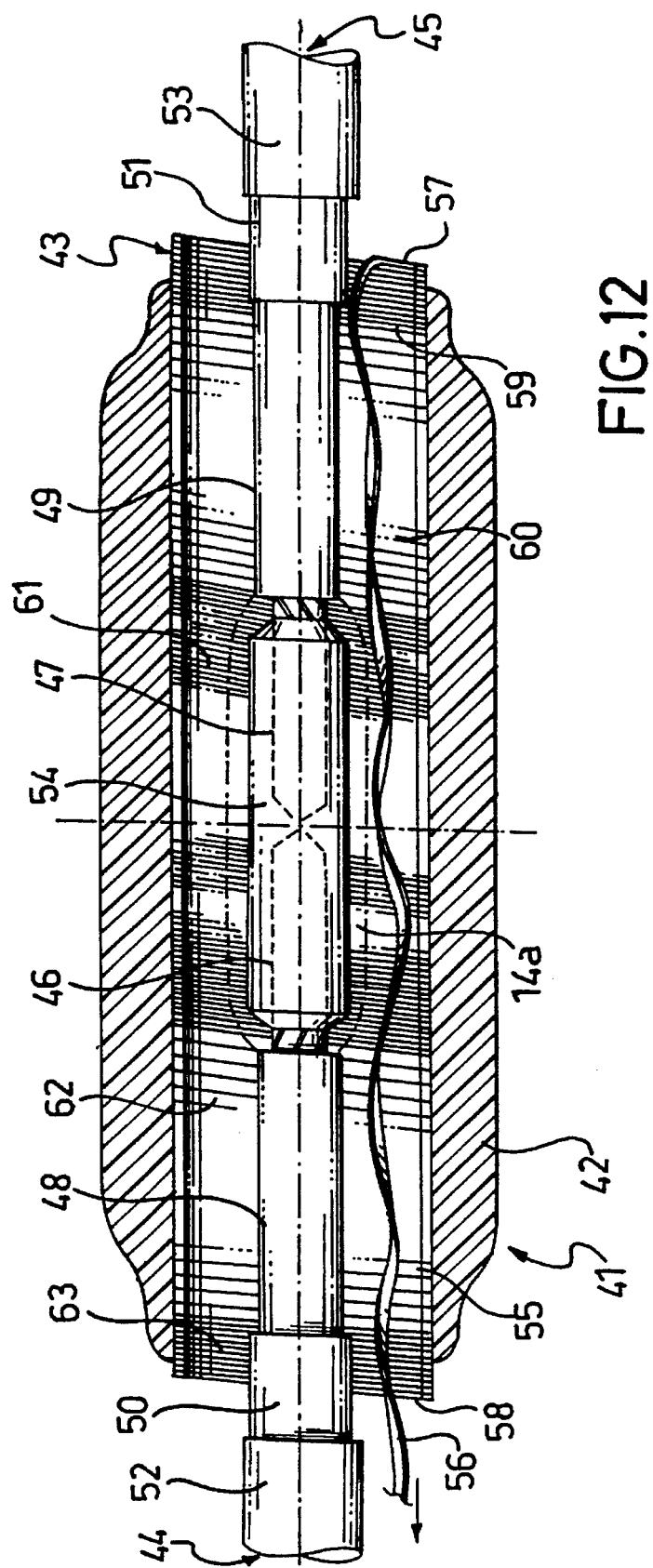
FIG. 12 is a sectional view showing schematically an enclosure assembly according to an alternative embodiment of the invention and including a support formed of a single tubular body, as fitted over two electric cables spliced together before removing the support.

The clamp 14 (or the like means of connection provided) and the area where the conductors 6, 7 have been stripped may be covered wih a filler, such as self-amalgamating tapes, compounds, silicone grease or the like, known in the art, as schematically denoted by reference 14a in FIG. 1 and FIG. 12.

Additional applications of such materials, specifically silicone grease, may be provided at the ends of the scalarly cut off layers, particularly at the cut end of the semiconductive shielding layer 10, 11.

Then, the sleeve 2, which is axially continuous, is arranged to cover the spliced area to restore insulation of the whole.

For this purpose, the sleeve 2 is formed from an elastomer material having specified elastic and electric characteristics in relation to the intended application, as is well-known in the art.

As an example, a sleeve 2 of a suitable type for use with medium voltages, as previously mentioned, may include a number of coaxial layers, the innermost of which, indicated at 2a in FIG. 1, may be an elastomer material of the field-control variety or comprise a portion of a conductive material, at the location of the removed insulator portion, or the like, contingent on different known constructions, the aim being in all cases to attenuate the strength of the electric field appearing in the splice area, wherein the insulation has been discontinued.

The ends of the sleeve, the field-control layer, or semiconductive material portion, depending on the technical solution of choice, should be positioned in all cases with precision relatively to the ends of the shields 10, 11 of the cables, or respectively of the discontinued insulator portion, if the sleeve is to perform its intended function.

For its installation around the spliced area of the cables, the sleeve 2 is assembled to the tubular support 3 such that is can be slid unrestrictedly over the cables and then set firmly in place about the cables by removing the tubular support.

To that aim, the sleeve 2 is assembled to the tubular support 3 in a condition of high elastic deformation, thereby exerting a correspondingly high external pressure thereon.

As an example, with sleeves adapted for medium voltage applications, as previously mentioned, which are intended for installation on cables having an outside diameter in the 20 to 43 mm range, this pressure may be on the order of 1 MPa and the sleeve expansion of 200–300%.

In order to withstand this pressure without collapsing, specifically from instability under external pressure, a tubular support made of such a polymer material as PVC (polyvinylchloride), PP (polypropylene) and the like should have a fairly large wall thickness.

As an example, a PP tubular support having an outside diameter of about 50 mm, capable of withstanding a pressure of 1 MPa at a temperature of 60° C., may have to have a wall thickness of about 3 mm.

In the embodiment of FIG. 1, the support 3 comprises two tubular bodies 16 and 17, which are substantially cylindrical in shape and abut each other in mutual continuation relationship at respective ends 18 and 19. The tubular bodies 16 and 17 have substantially the same axial length.

Each of the tubular bodies 16 and 17 consists of a respective strip 20, 21 of a strong flexible plastics material laid into a helix having interconnected contiguous turns, severable means securing each turn to an adjacent turn and said turns of said body being made of a material of dimensions which provide a radial resistance to the pressure applied thereto by the stretched sleeve sufficient to maintain said sleeve in its stretched state. This construction may be obtained, for example, by forming a helical groove in a tubular stock, such that the material portion left over from the groove cutting step will act as an interconnecting member for the turns; alternatively, this same construction may be obtained with other conventional methods, such as by forming sequential through-going cuts along a helical line around a tubular body, or winding a strip stock into a helix with bonded adjacent turns.

The tubular bodies 16 and 17 can be removed progressively from the sleeve 2 interior by application of a pull force to the strip 20, 21, thereby causing the adjacent turns to come progressively apart; thus, the strip 20, 21 is drawn out to allow the sleeve 2 to shrink elastically about the underlying cables 6, 7.

In order to enable application of said pull force, the support 3 includes strip pulling means for pulling out the strip 20, 21 and removing the support 3, starting with the end 18, 19 of each tubular body 16, 17.

The pulling means for the strip 20, 21 are each comprised, according to the invention, of an end portion 22, 23 of the strip 20, 21 which is not wound helically but rather let loose and bent over through the interior of the tubular body 16, 17 along a substantially axial direction and out through the opposite end 24, 25 of the tubular body, the end portion 22 comprising a pull strip which is an extension of said turns of a first helical pitch and the axial length of said turns of a first helical pitch is at least equal to the axial length of said pull strip and has at least the axial length of said sleeve.

Each of the tubular bodies 16 and 17 comprises regions where the helix of the strip 20, 21 has a coarse pitch and regions where the helix has a fine pitch; fine pitch means here a significantly shorter pitch than that of the remaining regions referred to as coarse pitch regions. The fine pitch regions are comprised of a plurality of turns of the strip and have a first helical pitch and hence, an axial thickness, less than other turns adjacent to said plurality of turns, which other turns, being those in the regions of coarse pitch and thereby having a second helical pitch and a greater axial thickness.

In particular, each tubular body 16, 17 comprises a leading end region 26, 27 (the term leading identifying that region which comes out first during the strip 20, 21 removal) having a coarse pitch central region 28, 29, and a trailing end region 30, 31 (the term trailing identifying that region which comes out last during the strip 20, 21 removal), again with a fine pitch. Accordingly, the turns having a second helical pitch (a coarse pitch) are at both ends of said tubular supporting body and said turns having a first helical pitch are intermediate said turns of a second helical pitch. The turns of aid first helical pitch can be disposed at the axially central portion of said tubular supporting body. Alternatively, as illustrated in FIG. 1, the support can be comprised of two abutting tubular supporting bodies and each body can have a plurality of turns having a first helical pitch at both ends of said tubular supporting body and other turns having a second helical pitch are intermediate said turns of a first helical pitch.

Specifically in a preferred embodiment wherein the tubular supports have a wall thickness of approximately 3 mm and an outside diameter of 51 mm as appropriate for cables having a maximum sheath diameter of 43 mm, the helix pitch in the end regions 26, 27, 30, 31 is about 1 mm, and about 3 mm in the central regions 28, 29, and further in a preferred embodiment the turns of said first helical pitch extend around and have an axial length substantially equal to the axial length of the bared conductors 6, 7.

The transitions between fine pitch and coarse pitch regions may be more or less gradual, that is span a longer or shorter distance, depending on the support construction.

The minimum value of the pitch in the end regions is generally the minimum possible value consistent with performance aims.

It should be considered in this respect that the pull exerted on the strip should cause each turn to part from its adjacent turn until the tubular body is destroyed altogether.

In the preferred instance of the helical turns being obtained by means of a helical groove cut in the inner or outer wall of the tubular body 16, 17, proper performance requires that the pitch P be larger than the residual thickness R left intact.

Figure 8:
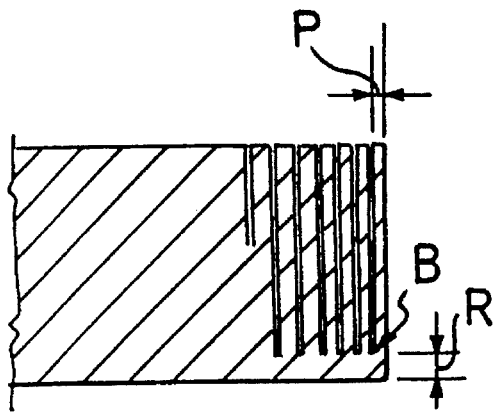
FIGS. 8 to 11 show schematically the mechanics of the strip turn separation from the tubular body; in particular.
Figure 9:
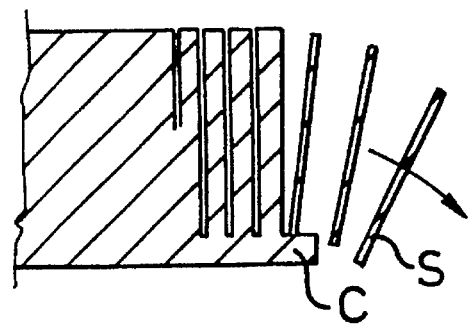

In fact, with an excessively fine pitch (FIGS. 8 and 9) relatively to the residual thickness R, the minimum cross-section to yield under the pull on the strip would be the base B of each turn S rather than the residual thickness R; as a result, an undesired cylindrical skirt C is left with—in actual practice—would be torn apart in segments and, on entrained by the strip, could cause harm by rubbing against the tubular body interior.

Figure 10:
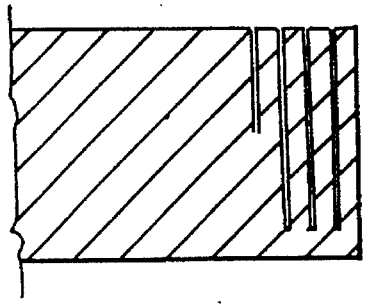
Figure 11:
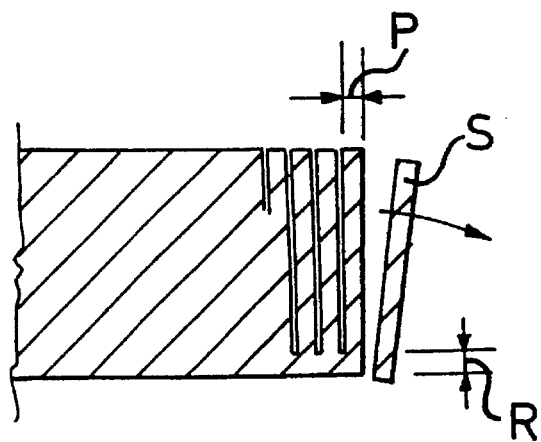

To avoid this, (FIGS. 10 and 11) the minimum pitch should be larger than the residual thickness R; that is the fine pitch should not be shorter than that causing a base B of the turn S to have a smaller cross-section than the residual thickness R interconnecting two adjacent turns S.

Accordingly, the choice of a particularly short pitch would be tied to the residual thickness provided; this residual thickness is limited, on the one side, by the method of forming the groove which separates the turns, subject to manufacturing tolerances, and on the other side, by the resistance of the support to the pressure from the expanded sleeve thereon, which could be enough to rupture the residual thickness and cause the support to collapse from instability under the unavoidable presence of longitudinal stresses.

In a preferred embodiment, the minimum residual thickness is approximately of 0.2 mm; under this condition, the minimum pitch may be slightly longer, but of preference, the minimum pitch is at least twice the residual thickness R, so as to make the turn separation a positive one, leaving no flash from partial rupture of just the scored portion.

A further restriction to the minimum pitch value comes from the fact that the strip cross-section subjected to the pull must have a higher resistance to the pull force than the tear resistance of the residual thickness.

This condition is always met by selecting a pitch at least twice the residual thickness, if the residual thickness happens to be constant; where the thickness is not constant, either by deliberate choice or due to manufacturing tolerances, this limitation would have to be taken into account anyhow.

Preferably, with a thickness of about 3 mm of the tubular support, the minimum pitch should be within the range of 0.5 to 1.5 mm, and the maximum pitch in the 2.5 to 4 mm range, in this case.

More generally, the pitch in the central region is the maximum consistent with the space available between the tubular support and the cable therein, with due account for that the strip unravelled in removing the tubular support may undergo a twisting action and take a helical configuration, as shown schematically in FIG. 6; under this condition, a pitch exceeding the clearance between the insulator of the largest of the cables for which the assembly is intended and the tubular support would be unacceptable for use on cable splices.

Preferably, the maximum pitch is selected at a value little different from that of the wall thickness of the tubular support.

Preferably, the tubular bodies 16 and 17 are identical with each other, and each of them is processed to be substantially symmetrical, this term meaning that the fine pitch end regions are symmetrical with respect to each other prior to unwinding the end portions 22, 23 of the strips 20, 21.

This allows the tubular bodies 16, 17 to be quite symmetrical in construction, and during the step of making the assembly 1, the strip to be unravelled from either end of each body for taking through its interior.

Figure 13:
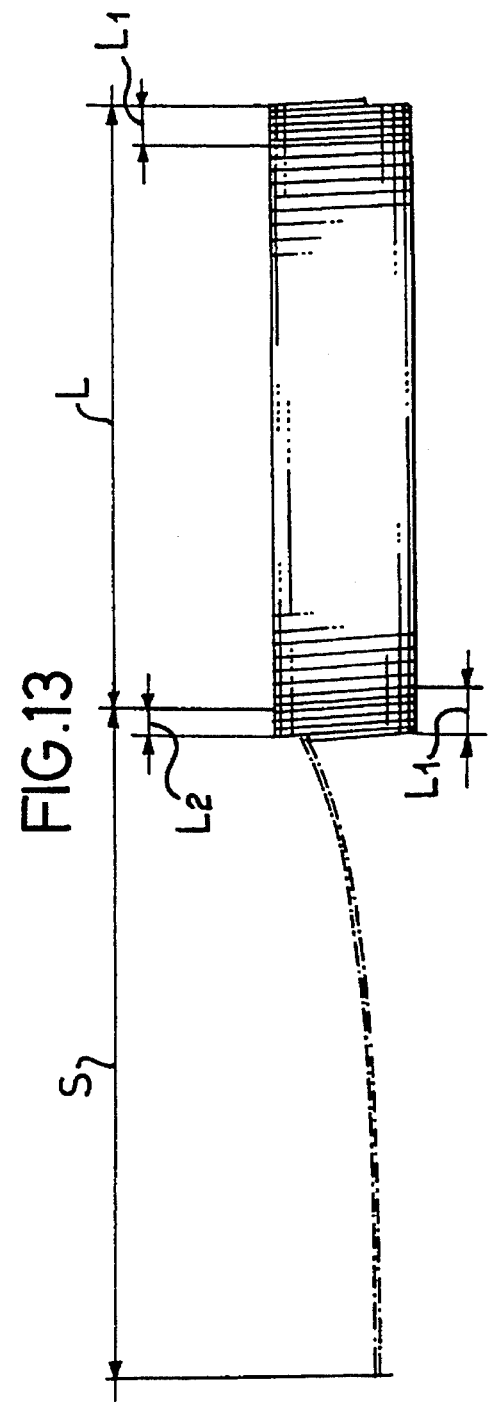
FIG. 13 is a schematic view of a tubular support according to the invention showing the relative dimensions of the helical portions having different pitch.

Preferably, as shown in FIG. 13, the fine pitch regions 26, 27, 30, 31 have a section L1 which includes both a few, e.g. two or three, fine pitch turns, and a section L2 which, once unravelled to a substantially straight form for taking through the tubular body interior, can yield a strip length S equal to the residual length L of the tubular body plus a portion few centimeters long for grasping.

Illustratively, such fine pitch regions may measure approximately 10–20 mm.

The operations involved in installing the enclosure assembly 1 of this invention are as follows.

After preparing the ends of the cables 4 and 5 for splicing together, in conformity with applicable standards and regulations to the cable type of interest, as previously mentioned, the enclosure assembly 1, with the support 3 and the sleeve 2 fitted thereon in a state of elastic expansion, is fitted over one of the two cables 4 or 5 and slid axially to a position overlying the outer protective sheath 12 or 13.

Figure 2:
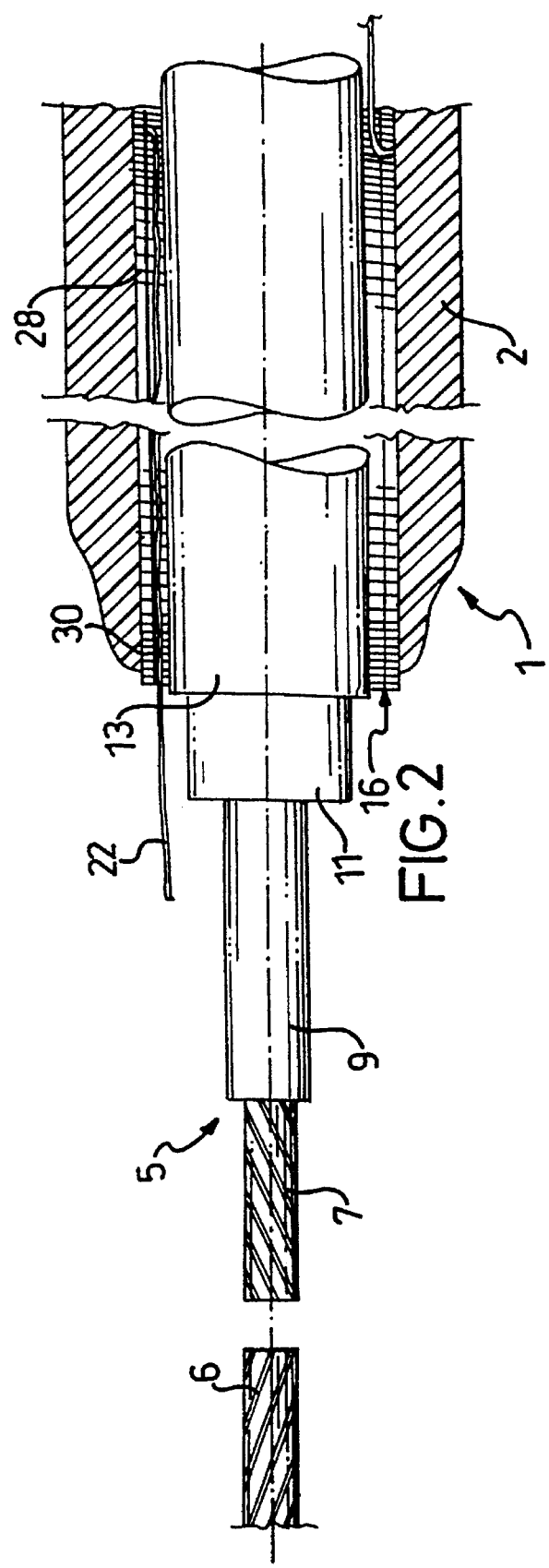
FIG. 2 is a sectional view showing schematically the assembly of FIG. 1 as fitted over one of the two cables to be spliced, prior to making the splice.

At this stage, illustrated by FIG. 2, under the assembly 1 there would locate the largest size element (complete cable 5); specially useful becomes, therefore, a minimal thickness for the end portion 22 of the strip 20, as provided in the fine pitch, leading end region 26; all the other conditions being the same, this allows utilization of the assembly 1 on larger diameter cables.

In fact, with the portion 22 of the strip 20 having a small thickness, it can be easily stretched out into a straight-line configuration because it would arrange itself along the direction of its smallest dimension by flexing with little effort, thereby constituting no impediment to fitting the assembly over the outer sheath of the cable.

With the prepared ends of the cables 4, 5 cleared, the conductors 6 and 7 are connected, and the internal parts of the joint dressed as by application of fillers, compounds, grease, and the like, as required.

Thereafter, the enclosure assembly 1 is moved into its intended region of installation and positioned as desired relatively to the clamp 14 and/or the various successive elements of the cables 4, 5.

For this purpose, there may be provided reference marks on the sleeve 2, such as a mark indicating its middle or another position of interest; based on this marking, it becomes easy to set and keep in position the enclosure assembly 1 longitudinally with respect to the spliced cables 4, 5.

With one end of the support 3, e.g. end 24, held firmly in place over the cable 4, either by hand or using appropriate equipment, thereby ensuring that the sleeve 2 and specifically its central region occupies the intended position, a pull force is applied to the corresponding pulling means, that is portion 22 of the strip 20.

In this way, the tubular body 16 is progressively removed from within the sleeve 2, to start from the middle region of the sleeve 2; as a result, the sleeve 2 will shrink about the clamp 14 and the insulator 8 of the underlying cable 4 at the middle region of the splice.

Throughout this installation step, the strip 20 will present minimum cross-section, it being taken from the fine pitch, leading end region 26; accordingly, as illustrated by FIGS. 4 and 5, the radial bulk of the loop formed by the strip 20 will be small, and the risk avoided of the strip 20 harming any protective materials applied to the splice at the conductors 6 and 7.

As the strip 20 continues to be pulled out, the coarse pitch, central region 28 is arrived at; in this region, the loop formed by the strip 20 has increased radial bulk, as a comparison of FIGS. 6 and 7 with FIGS. 4 and 5 brings out.

However, during the installation process, this loop will form in an area of the cable wherefrom some layers, specifically the outer sheath 13 and shield 11, have been removed, thereby the space available for the strip loop is also larger, and the strip can cause no harm to the residual insulating layer 9 or other materials applied.

Consequently, this coarse pitch, central region 28 makes for faster removal of the tubular body 16, while eliminating the risk of damaging the underlying elements.

Further pulling brings to the fine pitch, trailing end region 30, where the strip 20 is unwound from the tubular body 16 in a similar way to that described for region 26 and shown in FIGS. 4 and 5.

During this final step of the tubular body 16 removal, the fine pitch avoids the risk of the combined effects of the elastic forces which tend to contract the sleeve 2 and the tractive force exerted on the strip 20 causing undesired displacement of the residual portion of the tubular body 16.

This is a serious risk particularly where the assembly 1 is installed on an electric cable splice equipped with earthing connection for the capacitive shields of the spliced cables, as provided for by the above-noted EDF Standards.

Such is the case illustrated by FIG. 3 (wherein similar parts retain the same references as have been used in the other Figures).

A conductive plate 33 is attached to the shield 10 of cable 4 by wedging in beneath the outer sheath 12 so as to establish good electric contact with the cable shield 10; connected electrically to the plate 33 is an earthing cable 34.

If, while its last portion is being removed, the tubular body 16 is shifted outwards by the elastic contraction of the sleeve, the presence of the plate 33 and the cable 34 may serve to block the movement of the last bit of tubular support; in fact, the shifted residual portion may fail to come out completely, because impeded by the plate 33, and easily set itself askew, making further removal of the strip 20 difficult to accomplish.

Complete removal of the tubular body 16 leaves the sleeve 2 tightly set about the end of cable 4, axially rigid therewith.

Subsequently, a pull is applied to portion 25 of the strip 21, likewise to remove the tubular body 16 and complete the sleeve 2 tightening about the splice 3 at the desired location.

It should be noted that any errors in the positioning of the opposite ends of sleeve 2 due to axial expansion of the sleeve 2 would be shared in equal proportions by either ends, and the equal in absolute value to one half that of a support comprising a single tubular body.

For applications requiring no high positional accuracy, an enclosure assembly may be advantageous whose support is a single tubular body, as illustrated by FIG. 12.

In FIG. 12, as in FIG. 1, generally shown at 41 is an enclosure assembly comprising an elastic sleeve 42 fitted, in an elastically expanded condition, over a support 43 for ultimate use on two electric cables 44 and 45, spliced together and intended for medium voltage (10–30 kV) applications, for example.

The cables 44 and 45 comprise respective conductors 46 and 47 under respective insulators 48 and 49; normally provided on the insulator exterior are capacitive shields 50 and 51 of a semiconductor material, and protective outer sheaths 52 and 53.

At the location of the splice between the electric cables 44 and 45, all of the aforesaid elements of the cables 44 and 45 are removed, after one another, in a similar manner as described in connection with cables 4 and 5. Likewise, the bare portions of the conductors 46 and 47 are joined to each other by means of a clamp 54 of metal. The sleeve 42 is also basically the same as the previously described sleeve 2.

The support 43 is provided by a substantially cylindrical, single tubular body consisting of a strip 55 of a flexible and strong plastics material laid into a helix with interconnected adjacent turns. This construction is obtained in quite the same way as described hereinabove in connection with the tubular bodies 16 and 17 of assembly 1.

The tubular body 43 can be removed progressively from within the sleeve 42 by applying a pull force to the strip 55 whereby the adjacent turns can be loosened; thus, the strip 55 is taken out to allow the sleeve 42 to contract elastically about the underlying cables 46, 47.

To enable application of said pull force, the support 43 has an end portion 56 of the strip 55 which, instead of being wound into a helix, is bent over loosely along a substantially axial direction through the tubular body 43 interior from one end 57, and taken out through the opposite end 58 of the tubular body.

The tubular body 43 has regions wherein the helix of strip 55 is fine pitched, and regions wherein the helix is coarse pitched. Specifically, the tubular body 43 includes a leading end region 59 with a fine pitch, a first intermediate region 60 with a coarse pitch, a central region 61 with a fine pitch, a second intermediate region 62 with a coarse pitch, and a trailing end region 63 with a fine pitch.

Preferably, the tubular body 43 is made substantially symmetrical; this means, in particular, that mutually symmetrical are the fine pitch end regions; as an end portion of the strip is unwound and taken through the tubular body interior, the residual fine pitch end portion will comprise a few turns, as previously explained.

The fine pitch central portion 61, if any, is aimed at making the unravelled strip highly flexible in the area wherein coverings of a soft or readily damaged material would be provided, such as compounds, self-amalgamating tapes, grease, or the like, over the stripped conductors.

It is for this reason that this portion 61 spans, of preference, a distance which corresponds to the portion which has been stripped of its insulator, plus a few extra turns.

The installation procedure for this enclosure assembly 41 is basically the same as for assembly 1, but obviously simpler.

It should be noted, in particular, that the situation at the start (shown in FIG. 2 in connection with assembly 1) is quite the same with assembly 41; here again, specially valuable is a minimum thickness of the end portion 56 of strip 55, as provided by the fine pitch, leading end region 59.

Continued pull on the strip 55 will bring into play the first, coarse pitch intermediate region 60; in this region, the loop formed by the strip 20 has significant radial bulk, as illustrated by FIGS. 4 to 7 relating to assembly 1. Accordingly, this coarse pitch, intermediate region 60 would be provided to speed up removal of the tubular body 43 in cases where the underlying elements are unlikely to suffer damage.

Further pulling brings to play the fine pitch, central region 61, located at the middle of the sleeve 42; the strip 55 has there minimal cross-section, and therefore, the radial bulk of the loop formed by it is also minimal. Thus, the risk of the strip 55 harming any protective materials applied to the splice between the conductors 46 and 47 is positively avoided.

Further pulling results in the second, coarse pitch intermediate region 62 becoming involved, to which the same considerations apply as were made in relation to the first intermediate region 60.

Continued pulling brings to the fine pitch, trailing end region 63, whereat separation of the strip 55 from the tubular body 43 takes place the same as described for regions 59 and 61 (and regions 26 and 30 of assembly 1, as shown in FIGS. 4 and 5).

It stands to reason that, as pointed out hereinabove, an enclosure assembly according to the invention may be also used in applications other than that described in the foregoing, e.g. around cylindrical objects of various description, such as pipes, rods, bars, and the like, presenting comparable sheathing requirements.

We claim:

1. An assembly of an elastic sleeve with a tubular supporting body in the bore of said sleeve for the application of said sleeve to a cylindrical body, said assembly comprising:

a radially stretched sleeve of elastic material, the bore of said sleeve having a predetermined radius in its unstretched state;

a tubular supporting body disposed with the bore of said sleeve and having a longitudinal axis, said body having an external surface around said axis of a radius greater than said predetermined radius to cause radial stretching of said sleeve and having an internal surface around said axis of a radius smaller than the radius of said external surface, said body being formed by a plurality of helically wound, contiguous turns of a strip, severable means securing each turn to an adjacent turn and said turns of said body being made of a material of dimensions which provides a radial resistance to the pressure applied thereto by the stretched sleeve sufficient to maintain said sleeve in its stretched state; and a pull strip extending from a turn at one end of said body within said internal surface for pulling said turns apart;

the improvement wherein said tubular body having a first plurality of said turns within a first selected region and a second plurality of said turns within a second selected region, said first and said second plurality of said turns having a helical pitch and axial thickness, said helical pitch and said axial thickness of said first plurality of said turns being less than said helical pitch and said axial thickness of said second plurality of said turns; said second plurality of said turns being located adjacent to said first plurality of said turns.

2. An assembly as set forth in claim 1 wherein said first plurality of said turns are at at least one end of said tubular supporting body.

3. An assembly as set forth in claim 2 wherein said first plurality of said turns are at both ends of said tubular supporting body and said second plurality of said turns are intermediate said first plurality of said turns.

4. An assembly as set forth in claim 3 wherein the axial lengths of said turns of said first plurality of said turns are substantially the same.

5. An assembly as set forth in claim 1 wherein said pull strip is an extension of said first plurality of said turns and the axial length of said turns is at least equal to the axial length of said pull strip.

6. An assembly as set forth in claim 1 wherein said tubular supporting body is a single wound strip and has at least the axial length of said sleeve.

7. An assembly as set forth in claim 6 wherein said first plurality of said turns are also provided at the axially central portion of said tubular supporting body.

8. An assembly as set forth in claim 1 wherein said sleeve is axially continuous and said tubular supporting body comprises two portions with abutting ends, each of the abutting ends having said first plurality of said turns and a pull strip extending from the abutting end to the opposite end of said body.

9. An assembly as set forth in claim 1 which is around conductively connected and bared conductors of an electric cable, said first plurality of said turns extending around and having an axial length substantially equal to the axial length of said bared conductors.

10. An assembly as set forth in claim 1 wherein the axial length of said helical pitch of said first plurality of said turns is in the range from 0.5 to 1.5 mm.

11. An assembly as set forth in claim 1 wherein said turns are defined by a helical groove cut in the wall of a tubular body to a depth which leaves a residual thickness of the last mentioned said tubular body which can be ruptured by application of a pull force to the pull strip and wherein the axial length of said helical pitch of said first plurality of said turns is at least equal to said residual thickness.

12. An assembly as set forth in claim 11 wherein said axial length of said helical pitch is at least twice said residual thickness.

13. An assembly as set forth in claim 1 wherein the axial length of said helical pitch of said first plurality of said turns is between 20% and 50% of the radial thickness of said tubular supporting body between said external surface and said internal surface.

14. An assembly as set forth in claim 1 wherein the axial length of said helical pitch of said second plurality of said turns is in the range from 2 to 6 mm.

15. An assembly as set forth in claim 1 wherein the axial length of said helical pitch of said second plurality of said turns is between 75% and 200% of the radial thickness of said tubular supporting body between said external surface and said internal surface.

16. A tubular supporting body for supporting an elastic sleeve in an elastically stretched state, said tubular supporting body:

having a longitudinal axis, having an external surface around said axis of a predetermined radius greater than the unstretched radius of said sleeve so to cause radial stretching of said sleeve and having an internal surface around said axis of a radius smaller than the radius of said external surface, said body being formed by a plurality of helically wound, contiguous turns of a strip, severable means securing each turn to an adjacent turn and said turns of said body being made of a material of dimensions which provides a radial resistance to the pressure applied thereto by the stretched sleeve sufficient to maintain said sleeve in its stretched state; and a pull strip extending from a turn at one end of said body within said internal surface for pulling said turns apart;

the improvement wherein said tubular body having a first plurality of said turns within a first selected region ad a second plurality of said turns within a second selected region, said first and said second plurality of said turns having a helical pitch and axial thickness, said helical pitch and said axial thickness of said first plurality of said turns being less than said helical pitch and said axial thickness of said second plurality of said turns; said second plurality of said turns being located adjacent to said first plurality of said turns.

17. A tubular body as set forth in claim 16 wherein said first plurality of said turns are at at least one end of said tubular supporting body.

18. A tubular body as set forth in claim 17 wherein said first plurality of said turns are at both ends of said tubular supporting body and said second plurality of said turns are intermediate said first plurality of said turns.

19. A tubular body as set forth in claim 18 wherein the axial lengths of said turns of said first plurality of said turns are substantially the same.

20. A tubular body as set forth in claim 16 wherein said pull strip is an extension of said first plurality of said turns and the axial length of said turns is at least equal to the axial length of said pull strip.

21. A tubular body as set forth in claim 16 wherein said first plurality of said turns are also provided at the axially central portion of said tubular supporting body.

* * * * *